United States Patent [19]

McIllwain

[11] 3,807,246

[45] Apr. 30, 1974

[54] WORK TABLE DRIVE

[76] Inventor: James C. McIllwain, 1512 Ridgeway Dr., Richardson, Tex. 75080

[22] Filed: Feb. 20, 1973

[21] Appl. No.: 333,511

[52] U.S. Cl. .................. 74/229, 74/230.5, 74/231 M
[51] Int. Cl. ........ F16h 7/02, F16h 55/36, F16g 1/00
[58] Field of Search ............... 74/229, 231 M, 230.5

[56] References Cited
UNITED STATES PATENTS

| | | | |
|---|---|---|---|
| 2,717,822 | 9/1955 | Cooley | 346/139 |
| 3,719,098 | 3/1973 | Graves | 74/216.5 |

Primary Examiner—Leonard H. Gerin
Attorney, Agent, or Firm—Richards, Harris & Medlock

[57] ABSTRACT

A drive for an endless flexible steel belt forming a moving sanitary work surface. At least two drive wheels on a drive axis at one end of the belt and the two idler wheels on an idler axle at the other end of the belt serve to support the belt and drive the same at points spaced inwardly from the margins of the belt. The drive wheels have flat resilient tread surfaces engaging the belt along such tracks. Side disks having beveled edges engage the edges of the belt to force it to track a desired traverse.

5 Claims, 2 Drawing Figures

WORK TABLE DRIVE

This invention relates to the drive system for a stainless steel belted moving table, and more particularly to a drive system which enhances cleanliness and minimizes failure while assuring positive drive with desired tracking.

One continuously moving stainless steel belt table which is widely used in the food and meat industry is manufactured and sold by the Sandvik Conveyor Company of Maywood, N. J. The Sandvik table comprises a wide thin stainless steel belt to the inner surface of which are vulcanized V-belts which register in grooves of V-belt sheaves mounted on shafts at the ends of the belt loop. In practice it has been found that the V-belts vulcanized to the inner surface of the stainless steel belts are subject to failure by belt wear as well as by failure of the bond between the belt and the stainless steel member. Further, liquid trapped between the parallel V belt on the lower run is difficult to remove and represents a continuing problem from the standpoint of the sanitary engineer.

The present invention relates to an improved drive system wherein a pair of shafts are mounted with their axes horizontal and at least two sheaves on each shaft support the stainless steel band in a taut condition with the upper surface substantially horizontal. Each sheave has a flat resilient tread thereon which engages at points along the inner course of the belt at points spaced from the margins of the belt. Marginal disks on each said shaft at the margin of the belt present outwardly beveled perimeters which register with the edge of the belt to force the belt to track a desired course in response to the drive applied to the belt by driving one of the shafts having sheaves mounted thereon.

DESCRIPTION OF THE DRAWINGS

For a more complete understanding of the present invention and for further objects and advantages thereof, reference may be had to the following description taken in conjunction with the accompanying drawings in which.

DESCRIPTION OF THE PREFERRED EMBODIMENT

Figure 1:
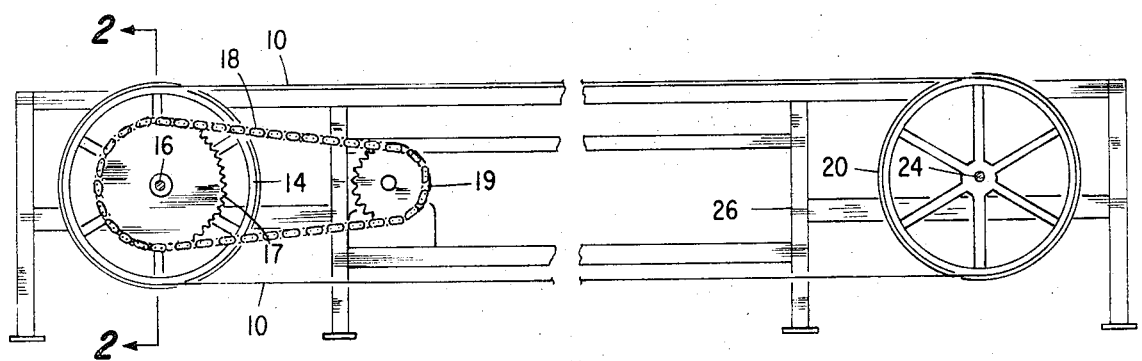
FIG. 1 is a side view of a work table embodying the present invention.

Referring now to FIG. 1, a work table having a continuous stainless steel belt 10 is adapted to be operated such that the belt 10 moves at a velocity of about 20 feet per minute. Such tables are employed in the meat industry where portions of carcasses are placed on the table 10. Workmen at stations along both sides of the table 10 then remove carcass portions from the table and may employ the table to offcarry the processed product to a packing station. The table in a typical installation is about 28 inches wide with the belt 10 having a total length of 80 or more feet so that the top working surface would be around 40 feet long. The belt is supported on drive sheaves 12 which are keyed to a shaft 16. A sprocket 17 is keyed to shaft 16 and is driven by way of a chain 18 from a motor 19. In the example here discussed, the sheaves had a diameter of about 30 inches. Idler sheaves 20 mounted on shaft 24 are so positioned on a frame 26 that the belt 10 is maintained taut. Longitudinal support ribs (not shown) engage the bottom surface of the upper run of the belt to prevent sagging under load.

By the present invention, the problem of providing a drive for the belt 10 which is positive and free from failure and which causes the belt to properly track the desired course is provided. More particularly, as shown in the sectional view of FIG. 2, the drive shaft 16 is mounted in bearings 30 and 32 which are supported on the frame 26. Shaft 16 is horizontal and is driven by way of sprocket 17 which is keyed to the shaft 16.

Figure 2:
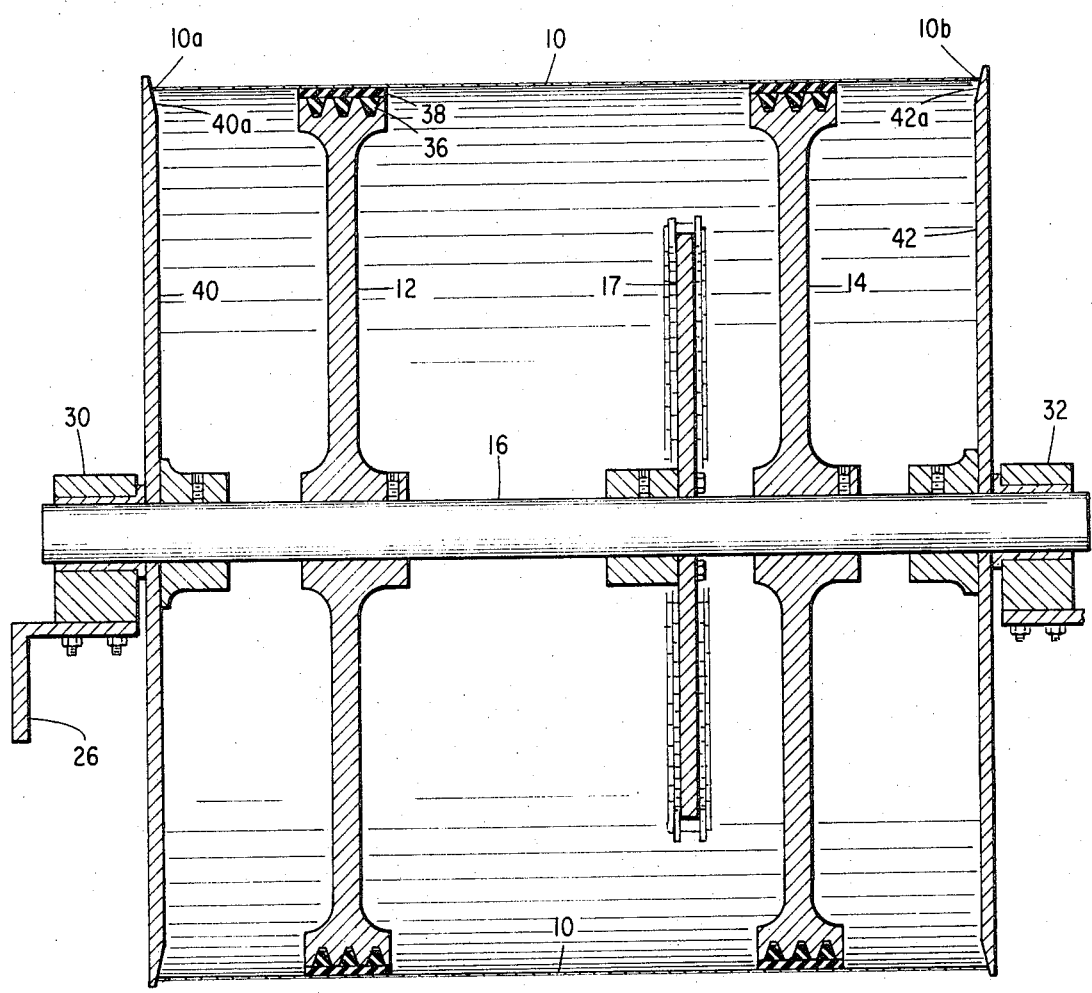
FIG. 2 is a view partially in section taken along the lines 2—2 of FIG. 1.

The stainless steel belt 10 is supported and driven by sheaves 12 and 14 which are keyed to shaft 16. Sheaves in the form illustrated in FIG. 2 are V belt drive pulleys. V-belts of a length to nest without bottoming in the V-grooves 36 were then provided of length to encircle sheave 12. Three such belts were employed. The belts were vulcanized to a neoprene band 38. The entire assembly was then adhesively secured to the periphery of the sheave 12 with the three belts in the three peripheral grooves. Waterproof adhesive was employed so that a unitary resilient drive tread was provided as the surface of sheave 12. Sheave 14 has the same drive structure. The sheaves 12 and 14 are located inwardly of the margins 10a and 10b of belt 10.

A pair of tracking disks 40 and 42 are keyed to shaft 16. The disks 40 and 42 have an outwardly beveled perimeter and a maximum diameter slightly larger than the diameter of the sheaves 12 and 14. By this means, the edges 10a and 10b of the belt 10 engage the surfaces 40a and 42a to maintain the belt in the desired course and to prevent movement thereof sideways during travel of the belt by the sheaves 12 and 14.

By this means, the belt 10 is positively driven in a manner such that the lower course is readily cleaned and maintained free of debris. The tread on the sheaves 12 and 14 are positively secured thereto so that failure is substantially entirely avoided. The side disks 40 and 42 force the desired tracking.

In one embodiment, sheaves were 30 inches in diameter and had a 3 inch tread with the neoprene band 38 being one-quarter inch in thickness and 3 inches wide. The disks 40 and 42 had a diameter of 30½ inches. Disks 40 and 42 were formed from one-half inch plate iron suitably coated with nickel. The belt was of the type manufactured and sold by Reynolds Aluminum and was grade 304 stainless steel of 0.040 inches thickness.

It will be understood that the idler end of the belt support system is the same as shown in FIG. 2 except no drive means is provided.

While only two sheaves have been shown at each end of the belt, more may be employed if desired. Various forms of drive may be employed in lieu of the drive shown in FIGURE Having described the invention in connection with certain specific embodiments thereof, it is to be understood that further modifications may now suggest themselves to those skilled in the art and it is intended to cover such modifications as fall within the scope of the appended claims.

What is claimed is:

1. A drive for a work table wherein a loop comprising an endless thin flexible stainless steel belt is to be driven past work stations which comprises:

a. a pair of axles mounted with axes thereof horizontal, b. at least two sheaves on each said axle to support said belt in a taut condition with the upper surface thereof substantially horizontal, c. a resilient flat tread surface on each said sheave engaging spaced apart paths on the inner surface of said belt, d. drive means connected to one of said shafts for rotating said sheaves to move said belt, and e. guide means on each of said shafts on opposite sides of said belt adapted to engage the edges of said belt and to maintain tracking during travel under forces produced through said sheaves.

2. A food conveyor table drive wherein a loop comprising a continuous wide belt forms a food support surface to be moved past a work station which comprises:

a. a drive shaft at one end of said loop and an idler shaft at the other end of said shaft, b. a plurality of wheels on each said shaft supporting said belt, c. a flat resilient tread on each wheel to provide a flat resilient contact surface, and d. a pair of edge disks on each said shaft at opposite edges of said belt, each said disk having an outward beveled inner periphery engaging an edge of said belt to cause said belt properly to track when moving with rotation of said wheels.

3. A drive for a work table wherein a loop comprising an endless thin flexible stainless steel belt is to be driven past work stations which comprises:

a. a pair of axles mounted with axes thereof horizontal, b. at least two sheaves on each said axle to support said belt in a taut condition with the upper surface thereof substantially horizontal, c. a resilient flat tread surface on each said sheave engaging spaced apart paths on the inner surface of said belt, d. drive means connected to one of said shafts for rotating said sheaves to move said belt, and e. two guide structures mounted on each of said shafts of diameter greater than the diameter of said sheaves and having inner peripheral edges beveled to engage the edges of said belt to maintain tracking during travel under forces produced through said sheaves.

4. A food conveyor table drive wherein a loop of a continuous wide belt forms a food support surface to be moved past a work station which comprises:

a. a driver shaft at one end of said loop and an idler shaft at the other end of said loop, b. a plurality of grooved wheels mounted on each said shaft each having a flat resilient tread to provide a flat resilient contact surface to support the inner surface of said belt, and c. resilient ribs on the inner surface of each said tread mating with grooves in said wheels.

5. The combination set forth in claim 4 in which each said tread is secured to one of said wheels in a watertight relation.

* * * * *